US005726401A

United States Patent [19]

Green et al.

[11] Patent Number: 5,726,401

[45] Date of Patent: Mar. 10, 1998

[54] CABLE/CROSSBAR INTERLOCK SYSTEM FOR CIRCUIT BREAKERS

[75] Inventors: Russell B. Green, Douglasville; John R. Patrick, Tucker, both of Ga.

[73] Assignee: Siemens Energy & Automation, Inc., Alpharetta, Ga.

[21] Appl. No.: 625,482

[22] Filed: Mar. 29, 1996

[51] Int. Cl.[6] .............................. H01H 9/26; H02B 11/00

[52] U.S. Cl. .......................................... 200/50.33; 361/607

[58] Field of Search .............................. 200/50.32, 50.33, 200/50.36, 50.01; 361/607, 609, 615, 616

[56] References Cited

U.S. PATENT DOCUMENTS

| | | | |
|---|---|---|---|
| 3,303,300 | 2/1967 | Turnbull | 200/50 |
| 3,939,725 | 2/1976 | Fisher | 74/503 |
| 4,286,242 | 8/1981 | Mrenna et al. | 335/160 |
| 4,370,635 | 1/1983 | Carroll et al. | 335/20 |
| 4,374,597 | 2/1983 | Mochida | 292/8 |
| 4,400,599 | 8/1983 | Rickmann | 200/50 |
| 4,419,549 | 12/1983 | Osborne | 200/50 |
| 4,516,100 | 5/1985 | Wallace et al. | 335/160 |
| 4,526,057 | 7/1985 | Mochida et al. | 74/501 |
| 4,626,638 | 12/1986 | Samples et al. | 200/331 |
| 4,788,453 | 11/1988 | Bohnen et al. | 307/119 |
| 4,902,859 | 2/1990 | Witzmann et al. | 200/50 |
| 5,193,666 | 3/1993 | Markowski et al. | 200/331 |
| 5,227,952 | 7/1993 | Romano et al. | 361/339 |
| 5,270,505 | 12/1993 | Magiera | 200/331 |
| 5,272,296 | 12/1993 | Robarge et al. | 200/331 |
| 5,319,168 | 6/1994 | Hutko et al. | 200/331 |
| 5,422,453 | 6/1995 | Smith et al. | 200/329 |
| 5,428,196 | 6/1995 | Beatty, Jr. et al. | 200/329 |
| 5,436,415 | 7/1995 | Smith et al. | 200/50 C |

FOREIGN PATENT DOCUMENTS

| | | |
|---|---|---|
| 40 02 936 A | 8/1991 | Germany . |
| 1 061 890 | 3/1967 | United Kingdom . |
| 1 400 298 | 7/1975 | United Kingdom . |

*Primary Examiner*—Adolf Berhane

[57] ABSTRACT

A cable interlock system is provided for preventing at least two circuit breakers from both being closed, comprising: a first circuit breaker assembly comprising a first main contact, a first cross bar, a first cross bar plunger, a first transfer assembly and a first operating handle, wherein the first operating handle is adapted to close or open the first circuit breaker assembly, and wherein the first cross bar plunger is adapted to contact the first cross bar, and wherein the first transfer assembly is adapted to move the first cross bar plunger; a second circuit breaker assembly comprising a second main contact, a second cross bar, a second cross bar plunger, a second transfer assembly and a second operating handle, wherein the second operating handle is adapted to close or open the second circuit breaker assembly, and wherein the second cross bar plunger is adapted to contact the second cross bar, and wherein the second transfer assembly is adapted to move the second cross bar plunger; a cable assembly having one end adapted for association with the first transfer assembly and having another end adapted for association with the second transfer assembly, wherein the one end of the cable assembly and the first transfer assembly cooperate with the first cross bar and the first cross bar plunger, and the another end of the cable assembly and the second transfer assembly cooperate with the second cross bar and the second cross bar plunger so as to prevent the first main contact and the second main contact from both being closed.

12 Claims, 8 Drawing Sheets

CABLE/CROSSBAR INTERLOCK SYSTEM FOR CIRCUIT BREAKERS

BACKGROUND OF THE INVENTION

1. Field of the Invention

This invention relates to an interlock system that interfaces with the cross bars of two (2) circuit breaker units so as to prevent both circuit breaker units from being closed at the same time.

2. Description of Related Art

Certain industrial power applications may require two circuit breakers to be interlocked to prevent them from being closed at the same time. For example, industrial molding facilities and other manufacturing plants use back-up power systems to continue operations if the electric utility service goes off line. When the circuit breaker is closed for electric utility service, inadvertently closing a circuit breaker from a back-up power system by placing the operator handle in its open or ON position could have potentially undesired effects. It is therefore necessary to interlock the two circuit breakers so as to avoid such potential effects.

There are various types of known interlock designs. For example, a "walking beam" interlock is disclosed in U.S. Pat. No. 4,902,859, which is assigned to Siemens Energy & Automation, Inc., and which details a mechanical interlock for interlocking two circuit breakers such that only one of the circuit breakers is on at a given time. The interlock is also configured so that it permits both circuit breakers to be off at the same time. The interlock includes a pivoting rocker arm and a linkage assembly associated with each breaker, wherein the rocker arm and linkage assemblies cooperate to transfer motion between the tie bars of the circuit breakers.

Another type of mechanical interlock is the "pivoted beam" interlock, these interlocks have also been used between two circuit breakers to prevent both breakers from being in their closed or open positions at the same time. Each circuit breaker includes a stationary contact and a movable contact blade. The circuit breakers also include plungers that extend through openings or apertures in the housings of the circuit breakers. The movable contact and blade is associated with each plunger so that the plunger moves outwardly when the contacts are closed and the plunger moves inwardly when the contacts are open. The plungers engage the pivoted beam on each side of its pivot so as to prevent the contacts from being open or closed at the same time.

There are, however, some disadvantages of such systems. For example, in some applications the circuit breakers must be partially disassembled to install such systems. Other systems may also require the circuit breakers to be mounted at the same fixed distance. For "walking beam" type systems, additional space may be required behind the circuit breaker mounting surface to connect the "walking beam". Moreover, at least certain of the known systems may not be usable with circuit breakers having different frame sizes.

Consequently, there is a need for an interlock system that is relatively easy to implement in circuit breaker units. There is also a need for an interlock system that may be mounted at varying distances from the circuit breaker units. In addition, there is also a need for an interlock system that allows the circuit breaker units to be mounted on plug-in units for which installation and removal is not as limited. Finally, there is also a need for an interlock system that may be used to interlock circuit breaker units having different size frames.

SUMMARY OF THE INVENTION

It is an object of the present invention to overcome the problems of the prior art.

It is another object of the present invention to provide a cable interlock system for preventing at least two circuit breakers from both being closed, comprising: a first circuit breaker assembly comprising a first main contact, a first cross bar, a first cross bar plunger, a first transfer assembly and a first operating handle, wherein the first operating handle is adapted to close or open the first circuit breaker assembly, and wherein the first cross bar plunger is adapted to contact the first cross bar, and wherein the first transfer assembly is adapted to move the first cross bar plunger; a second circuit breaker assembly comprising a second main contact, a second cross bar, a second cross bar plunger, a second transfer assembly and a second operating handle, wherein the second operating handle is adapted to close or open the second circuit breaker assembly, and wherein the second cross bar plunger is adapted to contact the second cross bar, and wherein the second transfer assembly is adapted to move the second cross bar plunger; a cable assembly having one end adapted for association with the first transfer assembly and having another end adapted for association with the second transfer assembly, wherein the one end of the cable assembly and the first transfer assembly cooperate with the first cross bar and the first cross bar plunger, and the another end of the cable assembly and the second transfer assembly cooperate with the second cross bar and the second cross bar plunger so as to prevent the first main contact and the second main contact from both being closed.

It is yet another object of the present invention to provide a cable interlock system for preventing at least two circuit breakers from both being closed, comprising: a first circuit breaker assembly means comprising a first main contact, a first cross bar, a first cross bar plunger, a first transfer assembly means and a first operating handle, wherein the first operating handle is for closing or opening the first circuit breaker assembly means, and wherein the first cross bar plunger is for contacting the first cross bar, and wherein the first transfer assembly means is for moving the first cross bar plunger; a second circuit breaker assembly means comprising a second main contact, a second cross bar, a second cross bar plunger, a second transfer assembly means and a second operating handle, wherein the second operating handle is for closing or opening the second circuit breaker assembly means, and wherein the second cross bar plunger is for contacting the second cross bar, and wherein the second transfer assembly is for moving the second cross bar plunger; a cable assembly means having one end for associating with the first transfer assembly means and having another end for associating with the second transfer assembly means, wherein the one end of the cable assembly means and the first transfer assembly means cooperate with the first cross bar and the first cross bar plunger, and the another end of the cable assembly means and the second transfer assembly means cooperate with the second cross bar and the second cross bar plunger so as to prevent the first main contact and the second main contact from both being closed.

It is still another object of the present invention to provide an interlock system for preventing at least two circuit breakers from both being closed, comprising: a first cross bar plunger and a first transfer assembly for use with a first circuit breaker assembly having a first operating handle adapted to open or close the first circuit breaker assembly, wherein the first cross bar plunger is adapted to contact the second cross bar, wherein the first transfer assembly is adapted to move the second cross bar plunger; a cable assembly having one end adapted for association with the first transfer assembly and having another end adapted for association with the second transfer assembly, wherein the one end of the cable assembly and the first transfer assembly cooperate with the first cross bar plunger and the first cross bar, and the another end of the cable assembly and the second transfer assembly cooperate with the second cross bar plunger and the second cross bar so as to prevent the first main contact and the second main contact from both being closed.

It is yet another object of the present invention to provide an interlock system for preventing at least two circuit breakers from both being closed, comprising: a first cross bar plunger means and a first transfer assembly means for use with a first circuit breaker assembly having a first operating handle for opening or closing the first circuit breaker assembly, wherein the first cross bar plunger means is for contacting the second cross bar, wherein the first transfer assembly means is for moving the second cross bar plunger; a cable assembly means having one end for connecting with the first transfer assembly means and having another end for connecting with the second transfer assembly means, wherein the one end of the cable assembly means and the first transfer assembly means cooperate with the first cross bar plunger means and the first cross bar, and the another end of the cable assembly means and the second transfer assembly means cooperate with the second cross bar plunger means and the second cross bar so as to prevent the first main contact and the second main contact from both being closed.

These and other objects, advantages and features of the present invention will be readily understood and appreciated with reference to the detailed description of preferred embodiments discussed below together with the accompanying drawings.

BRIEF DESCRIPTION OF THE INVENTION

DETAILED DESCRIPTION OF THE PREFERRED EMBODIMENT

Figure 1:
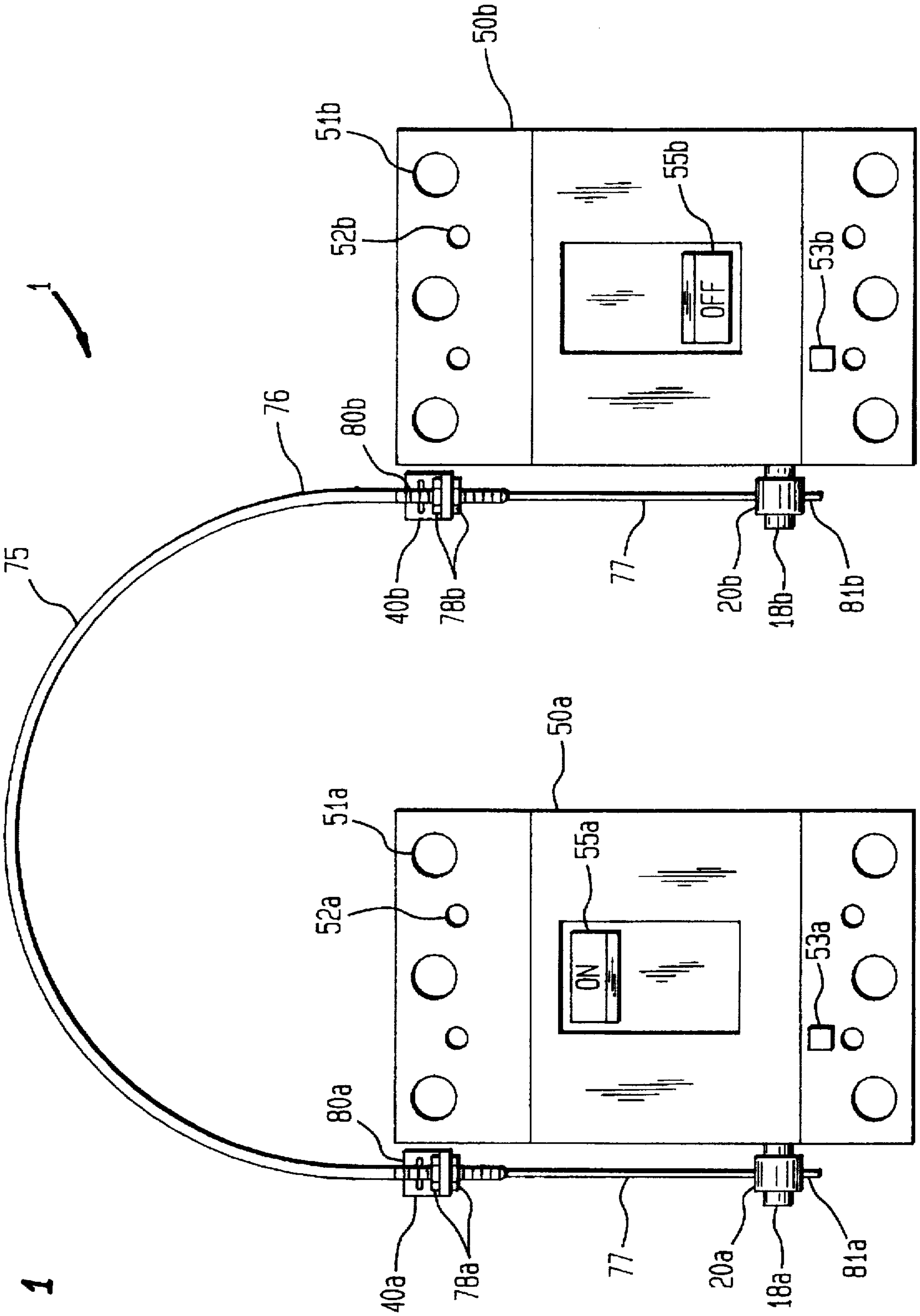
FIG. 1 is a drawing of one embodiment of the interlock system of the present invention.

Referring to FIGS. 1 to 3 and 4A, the cable interlock system 1 comprises two interlock assemblies 8a and 8b for use with two circuit breaker assemblies 49a and 49b. The circuit breaker assemblies 49a and 49b comprise circuit breaker units 50a and 50b and corresponding plug-in units 56a and 56b, respectively. The interlock assemblies 8a and 8b are partially mounted in or otherwise associated with plug-in units 56a and 56b, which are associated with corresponding circuit breaker units 50a and 50b, and are connected by a flexible utility cable assembly 75. For circuit breaker units 50a and 50b having the same frame size, the two interlock assemblies 8a and 8b are the same. Of course, for circuit breaker units having different frame sizes, the interlock assemblies 8a and 8b may be appropriately sized so as to work with such circuit breaker units.

The circuit breaker units 50a and 50b comprise operating handles 55a and 55b, push-to-trip buttons 53a and 53b, circuit breaker lug openings or apertures 51a and 51b, and circuit breaker mounting openings or apertures 52a and 52b, respectively. Threaded screws or bolts (not shown) are passed through circuit breaker mounting openings or apertures 52a and 52b and are received by threaded openings or apertures in the plug-in units 56a and 56b, respectively, so as to mount the circuit breaker units 50a and 50b on the plug-in units 56a and 56b, respectively. Additionally, as is known, the circuit breaker lug openings or apertures 51a and 51b may be used to receive threaded copper studs, which are plugged in to copper tulip contacts (not shown) that are provided in the plug-in units 56a and 56b. In this way, a current path may be provided through the plug-in units 56a and 56b to the circuit breaker units 50a and 50b.

Figure 2:
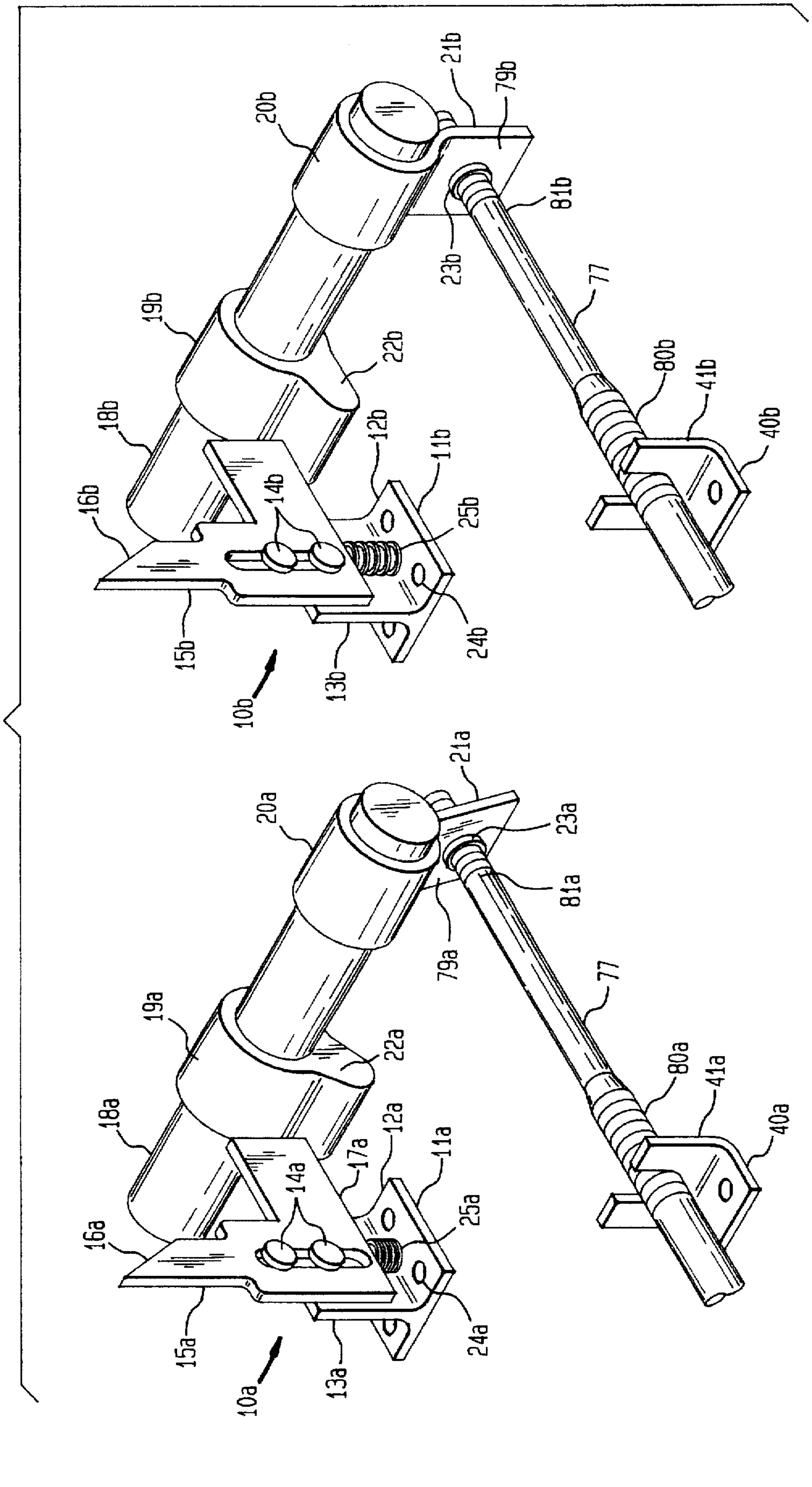
FIG. 2 is a drawing of the interlock assemblies used in the embodiment of the interlock system of the present invention, as shown in FIG. 1.
Figure 3:
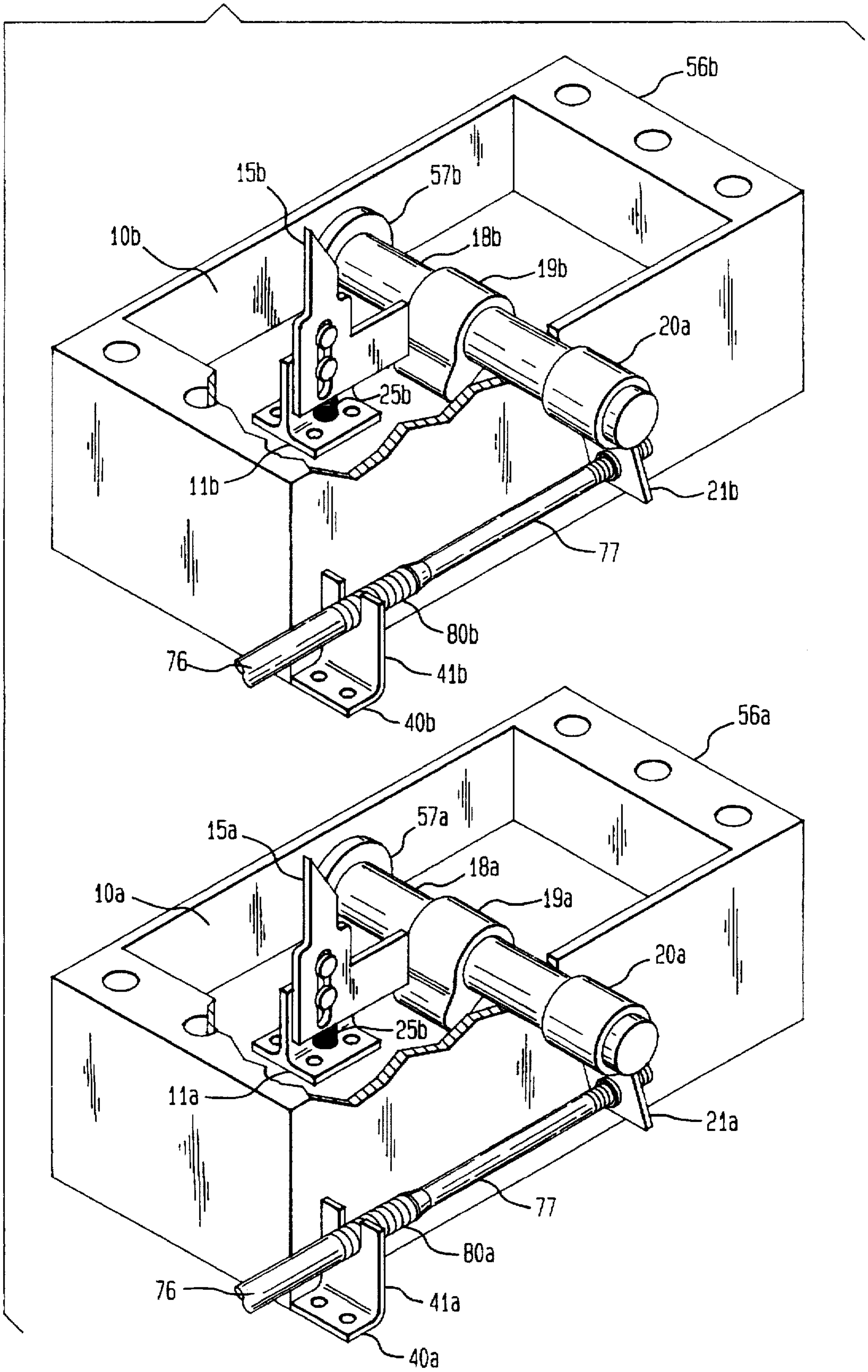
FIG. 3 is a partial cutaway view of the interlock assemblies in the plug-in units for the circuit breaker units of the embodiment of the interlock system of the present invention, as shown in FIG. 1.
Figure 4A:
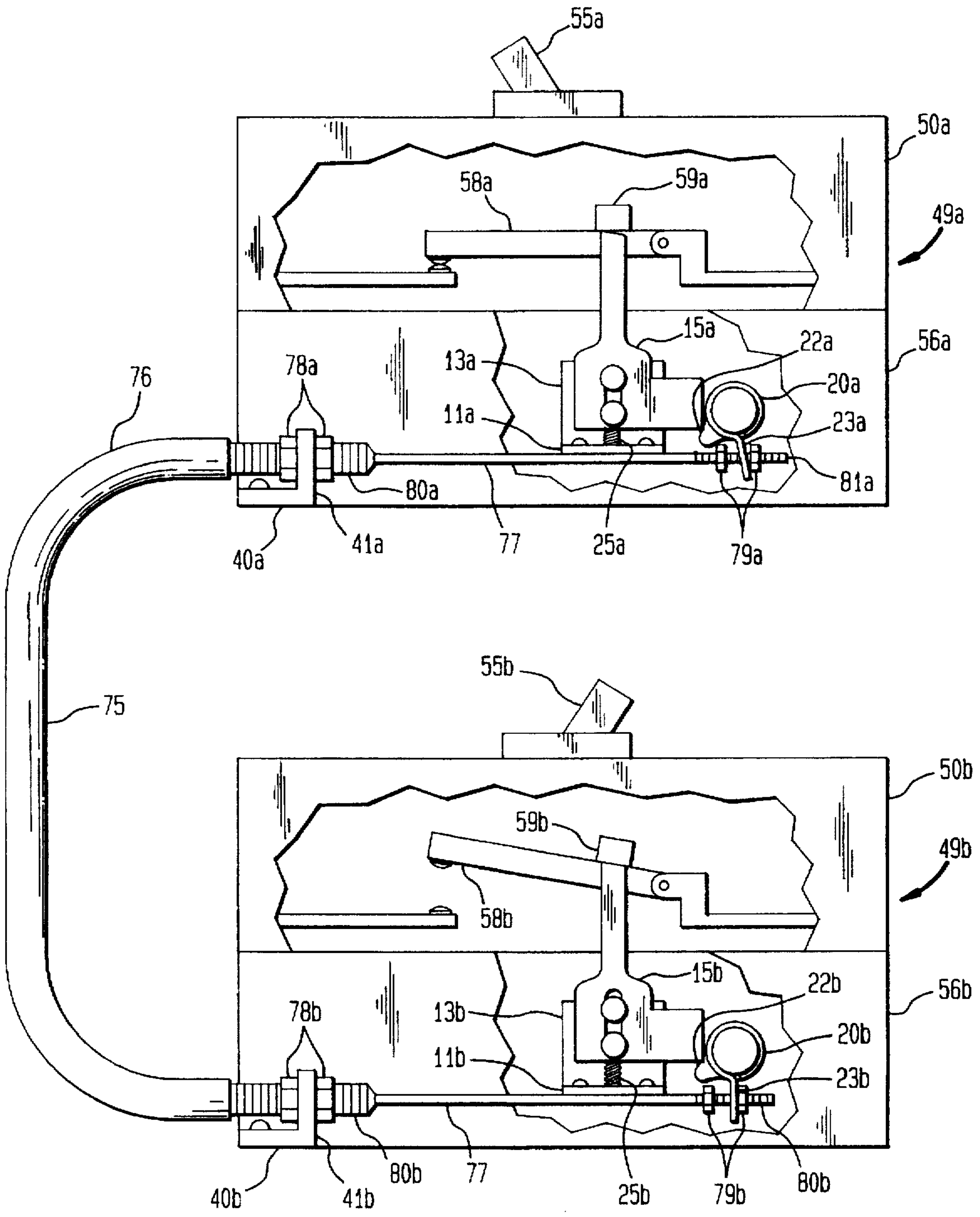
FIG. 4A is a partial cutaway side view of the embodiment of the interlock system of the present invention, as shown in FIG. 1.
Figure 4B:
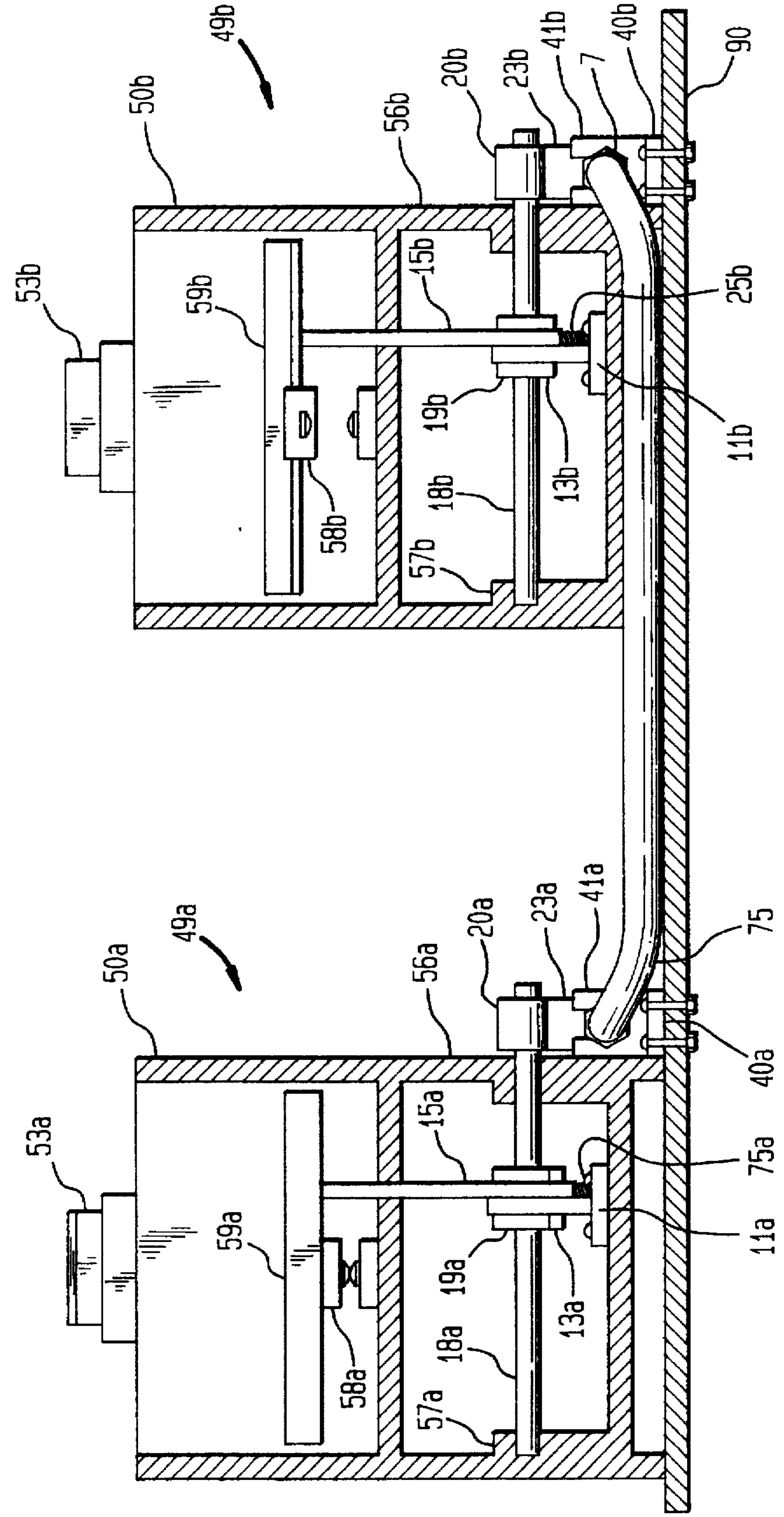
FIG. 4B is a top cross-sectional view of the embodiment of the interlock system of the present invention, as shown in FIG. 1.

More specifically, referring to FIG. 2, the interlock assemblies 8a and 8b comprise cross bar plunger bracket assemblies 10a and 10b, respectively, which interface with cross bars 59a and 59b (see FIGS. 4A and 4B). Although the system is described with reference to cross bars, it is understood that the system may also be described with reference to transverse bars, tie bars or tie rods or any such other suitably appropriate apparatus. The cross bar plunger assemblies 10a and 10b comprise plunger bracket bases 11a and 11b having cross bar plunger flanges 13a and 13b, respectively, which are perpendicular to the cross bar plunger base sections 12a and 12b for supporting cross bar plungers 15a and 15b having cross bar interfaces 16a and 16b, respectively. The plunger bracket assemblies 10a and 10b, which are preferably made from steel but which may also be made from any other suitably appropriate material, are attached to, secured to or otherwise associated with the inside base of the plug-in units 56a and 56b (see FIG. 3), which are associated respectively with the circuit breaker units 50a and 50b, by using threaded cutting screws (not shown) or any other suitably appropriate fastening apparatus for attaching or securing the plunger bracket bases 11a and 11b to the plug-in units 56a and 56b, respectively. The plunger bracket bases 11a and 11b support cross bar plungers 15a and 15b, respectively, so that the cross bar plungers 15a and 15b may reciprocally move along the perpendicular cross bar plunger flanges 13a and 13b of the plunger bracket bases 11a and 11b, respectively.

The cross bar plungers 15a and 15b, which are preferably made from a phenolic material but which may also be made from any other suitably appropriate material, are movably attached or secured to or otherwise movably associated with the perpendicular cross bar plunger flanges 13a and 13b of the plunger bracket bases 11a and 11b using shoulder rivets 14a and 14b, respectively, so as to allow each cross bar plunger to reciprocally move or travel along the cross bar plunger flange of its corresponding plunger bracket base. Bias spring assemblies 25a and 25b, which are attached or secured to or otherwise associated with cross bar plunger bracket bases 11*a* and 11*b*, respectively, are used to bias or force cross bar plungers 15*a* and 15*b* upwardly against cross bars 59*a* and 59*b*, respectively. The bias spring assemblies 25*a* and 25*b* may be attached or secured to or otherwise associated with the plunger bracket bases 11*a* and 11*b* by providing a cylinder-shaped projection or indentation for receiving the bias spring assemblies. Importantly, the bias springs 25*a* and 25*b* bias or force the cross bar plungers 15*a* and 15*b* upwardly so that they are above the flanges 22*a* and 22*b* of rejection cams 19*a* and 19*b*, respectively, when both circuit breaker units 50*a* and 50*b* are in their open or OFF position.

To provide the interlock feature, the cross bar plungers 15*a* and 15*b* may engage rejection cams 19*a* and 19*b* of transfer shafts 18*a* and 18*b* so as to prevent their movement, thereby preventing the main contacts 59*a* and 59*b* of the circuit breaker units 50*a* and 50*b* from both being closed. Of course, to interface with the cross bars 59*a* and 59*b* in the circuit breaker units 50*a* and 50*b*, respectively, the cross bar plungers 15*a* and 15*b* fit or pass through appropriate openings or apertures (not shown) provided in the back sides of the circuit breaker units 50*a* and 50*b* that meet the front sides of the plug-in units 56*a* and 56*b*, respectively, when they are mounted together.

The detailed internal construction of the circuit breakers, including the interaction of the cross bars, main contacts and operating handles, is known to those skilled in the art. For example, U.S. Pat. Nos. 4,484,164 and 4,680,564, both of which name Siemens-Allis, Inc. as assignee, and U.S. Pat. No. 5,120,921, which names Siemens Energy & Automation, Inc. as assignee, disclose the details of the circuit breakers that may be used with systems of the present inventions, and are hereby incorporated by reference.

The interlock system 1 comprises first and second transfer assemblies 9*a* and 9*b* that comprise transfer shafts 18*a* and 18*b*, respectively. The transfer shafts 18*a* and 18*b* comprise rejection cams 19*a* and 19*b* having flanges 22*a* and 22*b* and actuator levers 20*a* and 20*b* having flanges 21*a* and 21*b*, respectively. The transfer shafts 18*a* and 18*b*, which are preferably made from steel but which may also be made from any other suitably appropriate material, are used to transfer motion from the cross bar plungers 15*a* and 15*b* through a flexible utility cable assembly 75. This is done using the rejection cams 19*a* and 19*b* having flanges 22*a* and 22*b* and actuator levers 20*a* and 20*b* having flanges 21*a* and 21*b*. The rejection cams 19*a* and 19*b* and actuator levers 20*a* and 20*b* are attached or secured to or otherwise associated with the transfer shafts 18*a* and 18*b*, but may also be integral with the transfer shafts 18*a* and 18*b*. The transfer shafts 18*a* and 18*b* are each movably attached or secured to or otherwise movably associated with their respective plug-in units 56*a* and 56*b* using transfer shaft mountings 57*a* and 57*b* located in the plug-in units 56*a* and 56*b*, as shown in FIG. 3. The rejection cams 19*a* and 19*b* are preferably made from steel, but may also be made from any other suitably appropriate material.

When the circuit breaker unit 50*a* closes, its cross bar 59*a* causes the cross bar plunger 15*a* to rotate the transfer shaft 18*a* and rejection cam 19*a* until the rejection cam 19*a* contacts or rests against the rejection cam contact segment 17*a* of the cross bar plunger 15*a*. The rejection cam contact segment 17*a* of the cross bar plunger 15*a* blocks movement of the rejection cam 19*a* so as to provide the interlock feature. Additionally, when the operating handle 55*a* of the circuit breaker unit 50*a* is in its closed or ON position, the rejection cam 19*b* of circuit breaker unit 50*b* prevents the cross bar plunger 15*b* from moving so as to prevent the main contacts 58*b* of the circuit breaker unit 50*b* from also closing.

The flexible utility cable assembly 75 that is used to connect the first and second transfer assemblies 9*a* and 9*b* may be like that supplied by Cablecraft, Inc. of Tacoma, Wash. The flexible utility cable assembly 75 comprises a cable sleeve 76 and a stainless steel flexible utility cable 77. The flexible utility cable assembly 75 also has threaded swivel-conduit fittings 80*a* and 80*b* which fit on each end of the cable sleeve 76. The flexible utility cable 77 also has threaded end rods 81*a* and 81*b*. The flexible utility cable assembly 75 is attached or secured to or otherwise associated with cable mounting brackets 40*a* and 40*b* having u-shaped flanges 41*a* and 41*b* for receiving the threaded swivel-conduit fittings 80*a* and 80*b*, respectively. This may be done by using jam-nuts 78*a* and 78*b* on the threaded-swivel conduit fittings 80*a* and 80*b* on each side of the u-shaped flanges 41*a* and 41*b*, respectively. The threaded end rods 81*a* and 81*b* are attached or secured to or otherwise associated with the actuator levers 20*a* and 20*b* by fitting them through openings or apertures 79*a* and 79*b* and by using prevailing torque nuts 23*a* and 23*b* on each side of the actuator lever flanges 21*a* and 21*b*, respectively. The flexible utility cable 77 is used to transfer force from the actuator lever of one transfer assembly to the actuator lever of the other transfer assembly so as to interlock both circuit breaker units 50*a* and 50*b*.

FIG. 4A shows a partial cutaway side view of the interlock assemblies and plug-in units of the interlock system of the present invention, as shown in FIG. 1. FIG. 4B shows a cross-sectional view of the top of the interlock assemblies, circuit breaker units and plug-in units of the interlock system of the present invention, as shown in FIG. 1.

Referring to FIG. 4B, the cable mounting brackets 40*a* and 40*b*, which are preferably made from steel but which may also be made from any other suitably appropriate material, are attached or secured to or otherwise associated with the basepan 90, as are the circuit breaker units 50*a* and 50*b* and plug-in units 56*a* and 56*b*, as shown in FIG. 4B. The cable mounting brackets 40*a* and 40*b* may be secured using their openings or apertures and threaded cutting screws or any other suitably appropriate fastening apparatus. The mounting brackets 40*a* and 40*b* may also be integral with the basepan 90. The mounting brackets 40*a* and 40*b* are used to support the flexible utility cable assembly 75.

Referring to FIGS. 1, 2, 3, 4A and 4B, the cable interlock system 1 operates in the following way. When the operating handles 55*a* and 55*b* of circuit breaker units 50*a* and 50*b* are in their OFF position so that the circuit breaker units 50*a* and 50*b* are open, the cable interlock system 1 is in a free state. As the operating handle 55*a* of the circuit breaker unit 50*a* is moved or toggled to the ON position so as to close the circuit breaker unit 50*a*, its cross bar 59*a* engages the cross bar plunger 15*a* and forces it to move downwardly with respect to the cross bar plunger bracket base 11*a*. As discussed, two shoulder rivets 14*a* allow the cross bar plunger 15*a* to reciprocally move along the cross bar plunger flange 13*a* of the cross bar plunger bracket base 11*a*. As the cross bar plunger 15*a* moves downwardly, it compresses bias spring 25*a* and engages the rejection cam 19*a* of the transfer shaft 18*a* so as to rotate the transfer shaft 18*a* and thereby rotate the actuator lever 20*a*. Since the actuator lever 20*a* is connected to the threaded end rod 81*a*, using prevailing torque nuts 79*a* on each side of the opening 23*a* in the actuator lever flange 21*a*, the actuator lever 20*a* pulls the flexible utility cable 77 so as to rotate transfer shaft 18*b* and thereby force upwardly the cross bar plunger 15*b* of circuit breaker unit 50*b*, which then blocks the cross bar 59*b* of circuit breaker unit 50*b* so as to prevent circuit breaker unit 50*b* from being closed.

The force associated with attempting to close circuit breaker unit 50*b* is not transferred back to circuit breaker unit 50*a* because of bypass blocking. Bypass blocking occurs when the cross bar plunger 15*a* of circuit breaker unit 50*a* moves or travels downwardly past the point at which it engages with the rejection cam 19*a*. The force associated with attempting to close circuit breaker unit 50*b* is transferred back to the rejection cam 19*b* of circuit breaker unit 50*b* and is perpendicular to the direction that the cross bar plunger 15*b* moves or travels along. Accordingly, the force associated with attempting to close circuit breaker unit 50*b* does not act on the cross bar 15*a* of circuit breaker unit 50*a*. Thus, even though the operating handle 55*b* of the circuit breaker 50*b* may be moved or toggled to its ON position, the main contacts 58*b* will not be able to close.

Figure 5:
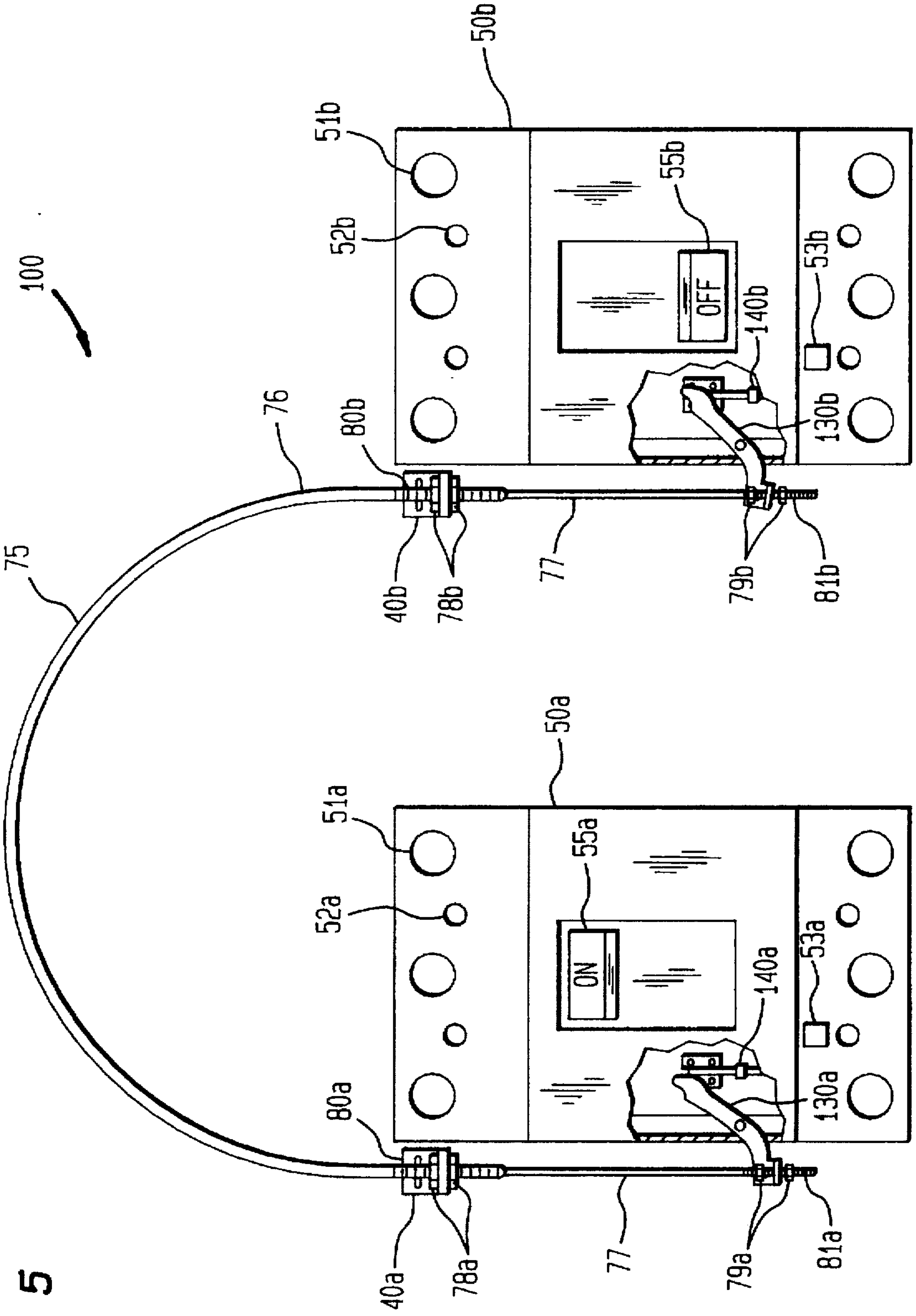
FIG. 5 is a drawing having a partial cutaway view of an alternative embodiment of the interlock system of the present invention.
Figure 6:
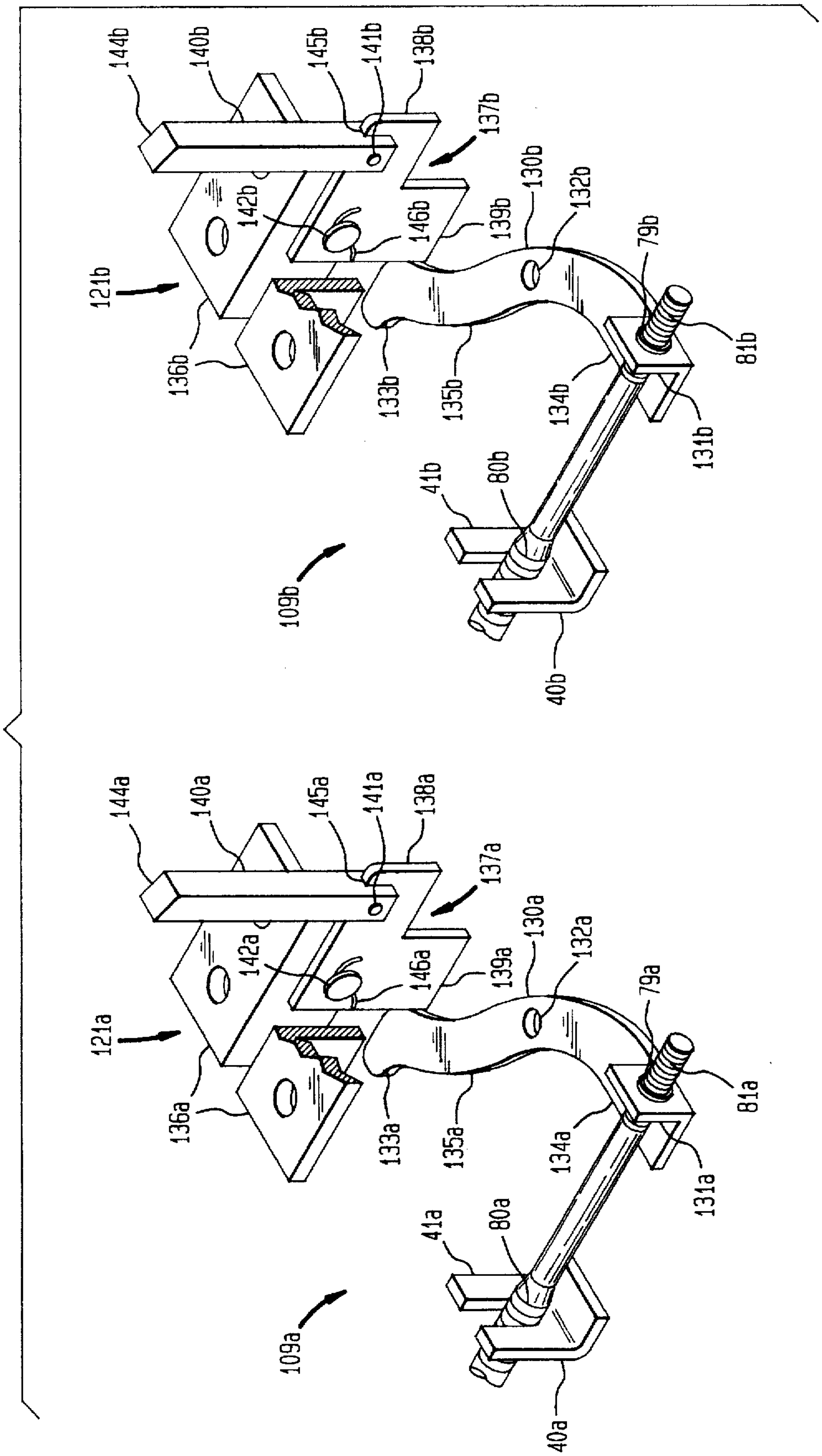
FIG. 6 is a drawing of the interlock assemblies used in the alternative embodiment of the interlock system of the present invention, as shown in FIG. 5.
Figure 7:
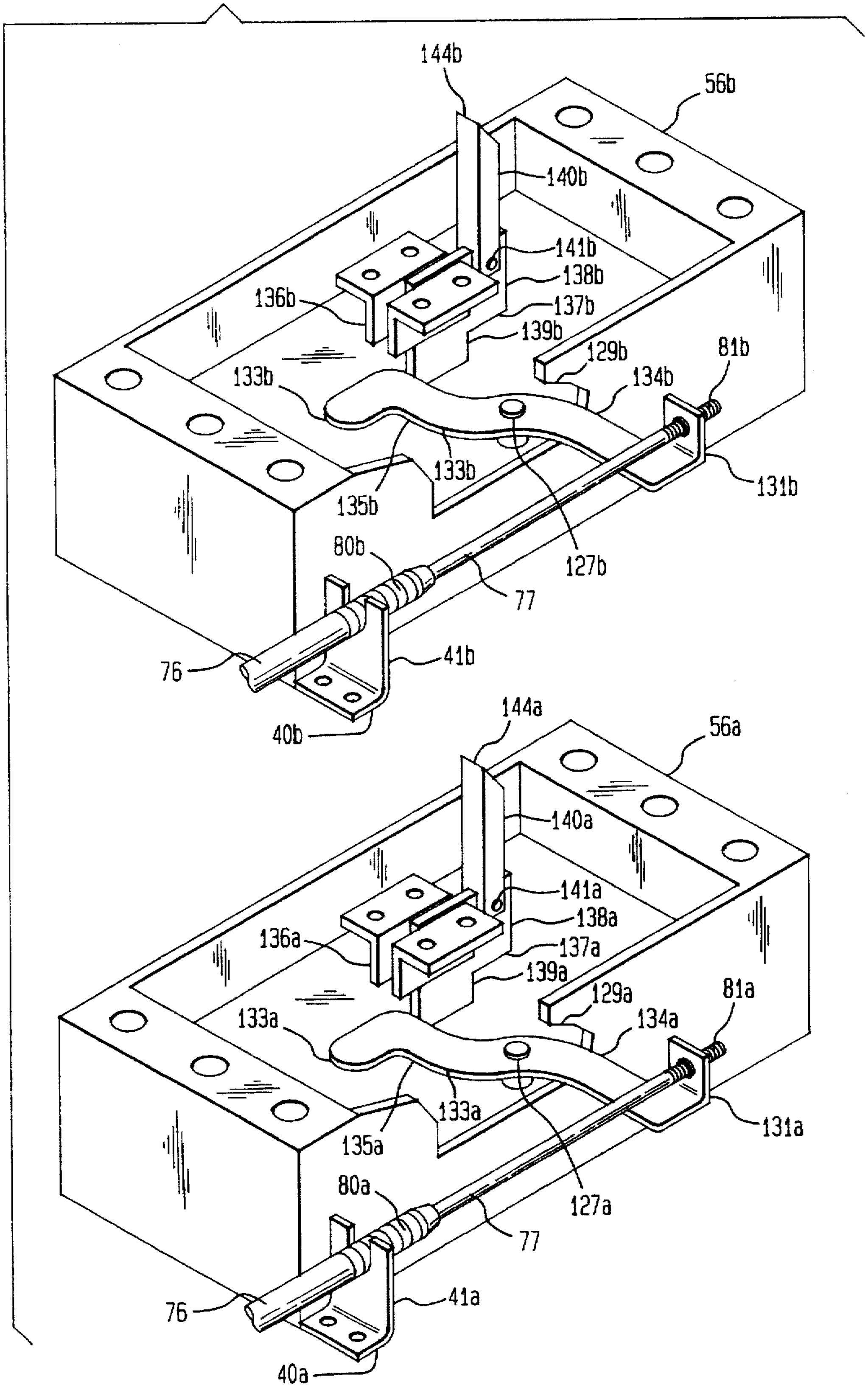
FIG. 7 is a partial cutaway view of the interlock assemblies in the plug-in units of the alternative embodiment of the interlock system of the present invention, as shown in FIG. 5.

An alternative embodiment of the cable interlock system is shown in FIGS. 5, 6 and 7. Referring to these figures, the cable interlock system 100 comprises two interlock assemblies 108*a* and 108*b* that are connected by the flexible utility cable assembly 75. The interlock assemblies 108*a* and 108*b* comprise the cross bar plunger bracket assemblies 121*a* and 121*b* and first and second transfer assemblies 128*a* and 128*b*. The first and second transfer assemblies comprise lever arms 130*a* and 130*b*, respectively. The plunger bracket assemblies 121*a* and 121*b* comprise cross bar plunger bracket bases 136*a* and 136*b*, which are preferably made of steel but which may also be made from any other suitably appropriate materials. The cross bar plunger bracket bases 136*a* and 136*b* comprise two L-shaped brackets, each of which has two openings or apertures for threaded cutting screws or any other suitably appropriate fastening apparatus that may be used to attach or secure to or otherwise associate the cross bar plunger bracket bases 136*a* and 136*b* with the backside (not shown) of the circuit breaker units 50*a* and 50*b*, respectively. As discussed, the circuit breaker units 50*a* and 50*b* are attached or secured to or otherwise associated with the front of the plug-in units 56*a* and 56*b*, respectively.

The plunger bracket assemblies 121*a* and 121*b* further comprise cross bar plungers 140*a* and 140*b*, which are preferably made of a phenolic material but which may also be made from any other suitably appropriate material. Lever actuators 137*a* and 137*b* fit in grooved or slotted openings or apertures 145*a* and 145*b* located at the base of cross bar plungers 140*a* and 140*b*, respectively. The cross bar plungers 140*a* and 140*b* are movably or pivotally attached or associated with the lever actuators 137*a* and 137*b*, respectively, using slip pins 141*a* and 141*b* to allow the cross bar plungers to move or pivot. Tortional bias springs 146*a* and 146*b* are positioned around pressfit pins 142*a* and 142*b* so as to bias or force cross bar plungers 140*a* and 140*b* upwardly against cross bars 59*a* and 59*b*, respectively. The torsional bias springs 146*a* and 146*b* are located between cross bar plunger brackets 136*a* and 136*b*, respectively, and lever actuators 137*a* and 137*b*, respectively. As a cross bar plunger 140 is displaced by its respective cross bar 59 of its circuit breaker unit 50, it causes its lever actuator 137 to rotate about press fit pin 142, which is used to movably or pivotally attach or otherwise associate each lever actuator 137 with its corresponding cross bar plunger bracket 136.

During interlock, if the circuit breaker unit 50*a* is in its closed or ON position, the tapered end 144*b* of the cross bar plunger 140*b* engages the cross bar 59*b* of the circuit breaker unit 50*b* so as to prevent the cross bar 59*b* from moving and closing the main contacts 58*b* of the circuit breaker unit 50*b*.

More specifically, the lever actuators 137*a* and 137*b*, which are preferably made from steel but which may also be made from any other suitably appropriate materials, are movably or pivotally attached or otherwise associated with the cross bar plunger brackets 136*a* and 136*b* using press fit pins 142*a* and 142*b*, respectively. The press fit pins 142*a* and 142*b* are arranged so as to allow the lever actuators to pivot or rotate when their respective cross bar plungers are moved. The lever actuators 137*a* and 137*b* are movably or pivotally attached or otherwise associated with the grooved or slotted ends 145*a* and 145*b* of cross bar plungers 140*a* and 140*b* using slip pins 141*a* and 141*b* respectively. When circuit breaker unit 50*a* is closed, the cross bar 59*a* moves downwardly, thereby displacing the cross bar plunger 140*a* downwardly so that the lever actuator 137*a* pivots or rotates about pin 142*a* clockwise. In this way base portion 139*a* of the lever actuator 137*a* engages the lever arm 130*a* and causes it to rotate counterclockwise. This results in the threaded end rod 81*a* of flexible utility cable 77 extending downwardly relative to threaded swivel-conduit fitting 81*a*. Correspondingly, the threaded end rod 81*b* of flexible utility cable 77 extends upwardly relative to threaded swivel-conduit fitting 81*b*, thereby causing lever arm 130*b* to rotate clockwise so as to engage the base portion 139*b* of lever actuator 137*b* and retain it in its position. This forces cross bar plunger 140*b* upwardly against cross bar 59*b* of circuit breaker unit 50*b* so as to prevent main contacts 58*b* from being closed. At its maximum downward position, the lever arm 130*b* will prevent the lever actuator 137*b* from rotating clockwise, thereby preventing the cross bar plunger 140*b* from moving the cross bar 59*b* of the circuit breaker unit 50*b*.

The lever arms 130*a* and 130*b*, which are preferably made of steel but which may also be made of any other suitably appropriate materials, are fitted through openings or apertures 129*a* and 129*b* in the plug-in units 156*a* and 156*b* respectively. Pin assemblies 127*a* and 127*b*, which fit through openings or apertures 132*a* and 132*b* in lever arms 130*a* and 130*b*, respectively, are used to movably or pivotally attach or otherwise associate the lever arms 130*a* and 130*b* with the base of their respective plug-in units 56*a* and 56*b*. The lever arms 130*a* and 130*b* may also be attached to the basepan 90 that is used to mount the plug-in units 56*a* and 56*b* and circuit breaker units 50*a* and 50*b*. The threaded end rods 81*a* and 81*b* of flexible utility cable 77 are attached or secured to or otherwise associated with cable mounting attachment flanges 131*a* and 131*b* having openings or apertures for receiving the threaded end rods 81*a* and 81*b*, which are then secured using prevailing torque nuts 79*a* and 79*b* on each side of the cable attachment flanges 131*a* and 131*b* of lever arms 130*a* and 130*b*, respectively.

During interlock, the lever arm 130*a* interacts with lever actuator 137*a* in the following way. When the operating handle 55*a* of a circuit breaker unit 50*a* has been moved or toggled to its closed or ON position, the cross bar 59*a* acts on the cross bar plunger 140*a* so as to cause the lever actuator 137*a* to rotate clockwise, thereby causing the lever arm 130*a* to rotate counterclockwise until the lever arm 130*a* moves to its maximum upward position at which it cannot be moved any further by the lever actuator 137*a*.

When the lever arm 130*a* is in its maximum upward position, any force applied to rotate the lever arm 130*b* clockwise will result in a corresponding force on the lever actuator 137*b* that is perpendicular to the travel path of the lever actuator 137*b*. Thus, the base 139*b* of the lever actuator 137*b* acts to block or otherwise prevent the lever arm 130*b* from moving. The lever arm 130*b also forces the lever actuator 137***b* to remain in its open or OFF position by blocking the travel path of the lever actuator 137*b*, thereby preventing the cross bar plunger 140*b* from being moved by the cross bar 59*b* of the circuit breaker unit 50*b*, which prevents the main contacts 58*b* from closing.

As shown in FIGS. 5 to 7, the flexible cable mounting flange 131*a* of the lever arm 130*a* is formed at a perpendicular angle or other suitably appropriate oblique angle to the rest of the lever arm 130*a*. Lever arm 130*a* has a foot 133*a* for contacting the lever actuator Each threaded end rod 81*a* and 81*b* may be attached to lever arms 130*a* and 130*b*, respectively, using openings or apertures in the cable mounting flanges 131*a* and 131*b* and prevailing torque nuts 79*a* and 79*b* on each side of these openings or apertures. The flexible utility cable assembly 75 is also attached or secured to or otherwise associated with the mounting brackets 40*a* and 40*b* by using jam-nuts 78*b* and 78*b* on each side of the flexible cable threaded swivel-conduits 80*a* and 80*b*, which are received by the u-shaped flanges 41*a* and 41*b* of the cable mounting brackets 40*a* and 40*b*, as shown in FIGS. 5 to 7. Also, as discussed, the L-shaped cable mounting brackets 40*a* and 40*b* are attached or secured to or otherwise associated with the basepan 90 using threaded cutting screws or any other suitably appropriate fastening apparatus.

Referring to FIGS. 5 to 7, the cable interlock system 100 operates in the following way. When the operating handle 55*a* of circuit breaker unit 50*a* is moved or toggled to the ON position, the cross bar 59*a* engages the cross bar plunger 140*a* and causes it to move downwardly, thereby causing the lever actuator 137*a* to rotate clockwise around press fit pin 142*a* within the plunger brackets 136*a*. The lever actuator 137*a* then causes the lever arm 130*a* to rotate counterclockwise about pivot screw 127*a*. As lever arm 130*a* rotates, it pulls the cable 77, thereby causing lever arm 130*b* to rotate clockwise so as to block any movement by its corresponding lever actuator 137*b* so that the cross bar plunger 140*b* prevents the cross bar 59*b* from being moved to its ON or closed position.

Because of by-pass blocking, the force associated with attempting to move or toggle the operating handle 55*b* of the circuit breaker unit 50*b* to its ON or closed position is not transferred back to the cross bar 59*a* of circuit breaker unit 50*a*. In particular, when circuit breaker unit 50*a* is in its closed or ON position, the cross bar 59*a* will have forced the cross bar plunger 140*a* to cause the lever actuator 137*a* to rotate clockwise, thereby causing the lever arm to rotate counterclockwise until the lever actuator 137*a* cannot move the lever arm 130*a*. In this position, any force applied to the lever arm 130*a* to rotate it clockwise will result in a force on the lever actuator 137*a* that is perpendicular to the travel path of the lever actuator 137*a*. Thus, the base 139*a* of the lever actuator 137*a* acts to block movement of the lever arm 130*a*. Additionally, while the operating handle 55*a* of the circuit breaker unit 50*a* may be moved or toggled to its ON position, the main contacts 58*b* will not close.

While the present invention has been described in connection with what are the most practical and preferred embodiments as currently contemplated, it should be understood that the present invention is not limited to the disclosed embodiments. Accordingly, the present invention is intended to cover various modifications and equivalent arrangements, methods and structures that are within the spirit and scope of the claims.

What is claimed is:

1. A cable interlock system for preventing at least two circuit breakers from both being closed, comprising:

a first circuit breaker assembly comprising a first main contact, a first cross bar, a first cross bar plunger, a first rotational transfer assembly and a first operating handle, wherein said first operating handle is adapted to close or open said first circuit breaker assembly, and wherein said first cross bar plunger is adapted to contact said first cross bar, and wherein said first rotational transfer assembly is adapted to move said first cross bar plunger;

a second circuit breaker assembly comprising a second main contact, a second cross bar, a second cross bar plunger, a second rotational transfer assembly and a second operating handle, wherein said second operating handle is adapted to close or open said second circuit breaker assembly, and wherein said second cross bar plunger is adapted to contact said second cross bar, and wherein said second rotational transfer assembly is adapted to move said second cross bar plunger;

a cable assembly having one end adapted for association with said first rotational transfer assembly and having another end adapted for association with said second rotational transfer assembly, wherein said one end of said cable assembly and said first rotational transfer assembly cooperate with said first cross bar and said first cross bar plunger, and said another end of said cable assembly and said second rotational transfer assembly cooperate with said second cross bar and said second cross bar plunger so as to prevent said first main contact and said second main contact from both being closed.

2. A cable interlock system for preventing at least two circuit breakers from both being closed, comprising:

a first circuit breaker assembly means comprising a first main contact, a first cross bar, a first cross bar plunger, a first rotational transfer assembly means and a first operating handle, wherein said first operating handle is for closing or opening said first circuit breaker assembly means, and wherein said first cross bar plunger is for contacting said first cross bar, and wherein said first rotational transfer assembly means is for moving said first cross bar plunger;

a second circuit breaker assembly means comprising a second main contact, a second cross bar, a second cross bar plunger, a second rotational transfer assembly means and a second operating handle, wherein said second operating handle is for closing or opening said second circuit breaker assembly means, and wherein said second cross bar plunger is for contacting said second cross bar, and wherein said second rotational transfer assembly is for moving said second cross bar plunger;

a cable assembly means having one end for associating with said first rotational transfer assembly means and having another end for associating with said second rotational transfer assembly means, wherein said one end of said cable assembly means and said first rotational transfer assembly means cooperate with said first cross bar and said first cross bar plunger, and said another end of said cable assembly means and said second rotational transfer assembly means cooperate with said second cross bar and said second cross bar plunger so as to prevent said first main contact and said second main contact from both being closed.

3. A cable interlock system for preventing at least two circuit breakers from both being closed, comprising:

a first cross bar plunger and a first rotational transfer assembly for use with a first circuit breaker assembly having a first operating handle adapted to open or close the first circuit breaker assembly, wherein said first cross bar plunger is adapted to contact a first cross bar, and wherein said first rotational transfer assembly is adapted to rotate and move said first cross bar plunger;

a second cross bar plunger and a second rotational transfer assembly for use with a second circuit breaker assembly having a second operating handle adapted to open or close the second circuit breaker assembly, wherein said second cross bar plunger is adapted to contact a second cross bar, and wherein said second rotational transfer assembly is adapted to move said second cross bar plunger;

a cable assembly having one end adapted for association with said first rotational transfer assembly and having another end adapted for association with said second rotational transfer assembly, wherein said one end of said cable assembly and said first rotational transfer assembly cooperate with said first cross bar plunger and the first cross bar, and said another end of said cable assembly and said second rotational transfer assembly cooperate with said second cross bar plunger and the second cross bar so as to prevent the first circuit breaker assembly and the second circuit breaker assembly from both being closed.

4. A cable interlock system for preventing at least two circuit breakers from both being closed, comprising:

a first cross bar plunger means and a first rotational transfer assembly means for use with a first circuit breaker assembly having a first operating handle for opening or close the first circuit breaker assembly, wherein said first cross bar plunger means is for contacting a first cross bar, and wherein said first transfer assembly means is for moving the first cross bar plunger;

a second cross bar plunger means and a second rotational transfer assembly means for use with a second circuit breaker assembly having a second operating handle for opening or closing the second circuit breaker assembly, wherein said second cross bar plunger means is for contacting a second cross bar, and wherein said second rotational transfer assembly means is for moving said second cross bar plunger means;

a cable assembly means having one end for connecting with said first rotational transfer assembly means and having another end for connecting with said second rotational transfer assembly means, wherein said one end of said cable assembly means and said first rotational transfer assembly means cooperate with said first cross bar plunger means and the first cross bar means, and said another end of said cable assembly means and said second rotational transfer assembly means cooperate with said second cross bar plunger means and the second cross bar so as to prevent the first circuit breaker assembly and the second circuit breaker assembly from both being closed.

5. A cable interlock assembly system for preventing at least a first and second circuit breaker assemblies from both being closed, the first circuit breaker assembly having a first main contact, a first cross bar, a first cross bar plunger that is adapted to contact the first cross bar, a first operating handle that is adapted to close or open the first circuit breaker assembly, the second circuit breaker assembly having a second main contact, a second cross bar, a second cross bar plunger that is adapted to contact the second cross bar, a second operating handle that is adapted to close or open the second circuit breaker assembly, said cable interlock assembly comprising:

a first rotational transfer assembly associated with the first circuit breaker assembly that is adapted to move the first cross bar plunger;

a second rotational transfer assembly associated with the second circuit breaker assembly that is adapted to move the second cross bar plunger;

a cable assembly having one end adapted for association with said first rotational transfer assembly and having another end adapted for association with said second rotational transfer assembly, wherein said one end of said cable assembly and said first rotational transfer assembly cooperate with the first cross bar and the first cross bar plunger, and said another end of said cable assembly and said second rotational transfer assembly cooperate with the second cross bar and the second cross bar plunger so as to prevent the first main contact and the second main contact from both being closed.

6. A cable interlock assembly system means for preventing at least a first and second circuit breaker assemblies from both being closed, the first circuit breaker assembly having a first main contact, a first cross bar, a first cross bar plunger that is adapted to contact the first cross bar, a first operating handle that is adapted to close or open the first circuit breaker assembly, the second circuit breaker assembly having a second main contact, a second cross bar, a second cross bar plunger that is adapted to contact the second cross bar, a second operating handle that is adapted to close or open the second circuit breaker assembly, said cable interlock assembly comprising:

a first rotational transfer assembly means associated with the first circuit breaker assembly for moving the first cross bar plunger;

a second rotational transfer assembly means associated with the second circuit breaker assembly for moving the second cross bar plunger;

a cable assembly means having one end for being associated with said first rotational transfer assembly means and having another end for being associated with said second rotational transfer assembly means, wherein said one end of said cable assembly means and said first rotational transfer assembly means cooperate with the first cross bar and the first cross bar plunger, and said another end of said cable assembly means and said second rotational transfer assembly means cooperate with the second cross bar and the second cross bar plunger for preventing the first main contact and the second main contact from both being closed.

7. The system of claims 1, 3 or 5, wherein said first and second rotational transfer assemblies each comprise a rotational transfer shaft that is adapted to rotate so as to provide interlocking.

8. The system of claims 2, 4 or 6, wherein said first and second rotational transfer assembly means each comprise a rotational transfer shaft means for rotating so as to provide interlocking.

9. The system of claim 7, wherein each of said rotational transfer shafts further comprise an actuator lever and a rejection cam, wherein each actuator lever is adapted to transfer linear cable motion so as to cause said rotational transfer shafts to rotate so that said rejection cams prevent the first main contact and the second main contact from both being closed.

10. The system of claim 8, wherein each of said transfer shaft means further comprise a rejection cam means and an actuator lever means, wherein each actuator lever means is used for transferring linear cable motion so as to cause said rotational transfer shafts to rotate so that said rejection cam means are used for preventing the first main contact and the second main contact from both being closed.

11. The system of claims 1, 3 or 5, wherein said first and second rotational transfer assemblies each comprise a lever arm that is adapted to rotate so as to provide interlocking.

12. The system of claims 2, 4 or 6, wherein said first and second rotational transfer assembly means each comprise a lever arm means for rotating so as to provide interlocking.

* * * * *